(12) United States Patent
Afridi et al.

(10) Patent No.: US 12,348,050 B2
(45) Date of Patent: Jul. 1, 2025

(54) VARIABLE COMPENSATION INVERTER CIRCUIT AND RELATED TECHNIQUES

(71) Applicant: The Regents of the University of Colorado, a body corporate, Denver, CO (US)

(72) Inventors: Khurram K. Afridi, Boulder, CO (US); Sreyam Sinha, Boulder, CO (US); Ashish Kumar, Boulder, CO (US)

(73) Assignee: The Regents of the University of Colorado, a body corporate, Denver, CO (US)

( * ) Notice: Subject to any disclaimer, the term of this patent is extended or adjusted under 35 U.S.C. 154(b) by 0 days.

(21) Appl. No.: 16/633,796

(22) PCT Filed: Jul. 26, 2018

(86) PCT No.: PCT/US2018/043852
§ 371 (c)(1),
(2) Date: Jan. 24, 2020

(87) PCT Pub. No.: WO2019/023432
PCT Pub. Date: Jan. 31, 2019

(65) Prior Publication Data
US 2020/0195043 A1    Jun. 18, 2020

Related U.S. Application Data

(60) Provisional application No. 62/537,321, filed on Jul. 26, 2017.

(51) Int. Cl.
*H02J 50/05* (2016.01)
*H02J 50/12* (2016.01)
(Continued)

(52) U.S. Cl.
CPC .............. *H02J 50/05* (2016.02); *H02J 50/12* (2016.02); *H02M 3/33569* (2013.01); *H02M 1/007* (2021.05); *H02M 7/4815* (2021.05)

(58) Field of Classification Search
None
See application file for complete search history.

(56) References Cited

U.S. PATENT DOCUMENTS

2013/0120061 A1* 5/2013 van der Zanden et al. .................
H03F 1/0288
330/124 R
2016/0190943 A1* 6/2016 Chen .................. H02M 3/33569
363/21.06
(Continued)

FOREIGN PATENT DOCUMENTS

EP          3034002 A1 *  6/2016    .............. H02J 5/005

*Primary Examiner* — Rexford N Barnie
*Assistant Examiner* — Terrence R Willoughby
(74) *Attorney, Agent, or Firm* — WORKMAN NYDEGGER

(57) ABSTRACT

A high-frequency inverter architecture is provided that compensates for coupling variations in wireless power transfer (WPT) systems, while adapted to operate at a fixed frequency and maintaining high efficiency. This implementation, termed a variable compensation inverter (VCI), includes a plurality of high-frequency inverters feeding a lossless resonant network, with the inputs of the inverters fed by controllable voltages. By appropriately controlling the input voltages of the individual inverters and their relative phase-shift, the VCI can maintain near-resistive, and slightly but sufficiently inductive, loading of the inverters even as the reactance of the WPT coupler changes; hence, providing compensation while maintaining zero-voltage and near-zero-current switching. The VCI also ensures that the output power of the WPT system is maintained at a fixed level even during coupling variations.

17 Claims, 16 Drawing Sheets

(51) Int. Cl.
*H02M 3/335* (2006.01)
*H02M 1/00* (2006.01)
*H02M 7/48* (2007.01)

(56) References Cited

U.S. PATENT DOCUMENTS

2017/0324351 A1* 11/2017 Rochford ............. H04B 5/0081
2018/0097351 A1* 4/2018 Jha .......................... H02J 50/80
2018/0194236 A1* 7/2018 Elshaer ............... H02J 7/00034
2019/0165614 A1* 5/2019 Afridi ................. H02J 7/00712

* cited by examiner

VARIABLE COMPENSATION INVERTER CIRCUIT AND RELATED TECHNIQUES

CROSS-REFERENCE TO RELATED APPLICATIONS

This application claims the benefit of U.S. provisional Application No. 62/537,321 entitled "VARIABLE COMPENSATION INVERTER CIRCUIT AND RELATED TECHNIQUES", filed Jul. 26, 2017 of which is hereby incorporated by reference as though fully set forth herein.

GOVERNMENT LICENSE RIGHTS

This invention was made with government support under grant number 1554293 awarded by the National Science Foundation. The government has certain rights in the invention.

BACKGROUND

The present disclosure relates to inverter architectures adapted to compensate for coupling variations in wireless power transfer systems.

Wireless power transfer (WPT) can enhance consumer convenience by enabling autonomous charging in applications ranging from electric vehicles (EVs) to portable electronics. WPT approaches can be categorized into inductive WPT systems, which utilize a pair of magnetically coupled coils, and capacitive WPT systems, which utilize two pairs of electrically coupled plates as their coupler. Both inductive and capacitive WPT systems require circuit components that can compensate for the reactance of their coupler. To achieve effective power transfer, WPT systems are typically designed to operate at frequencies close to the resonance frequency of a resonant tank formed by the coupler and the compensation components. When the coupling reactance changes, either due to coupler misalignments or due to variations in the air-gap, so does the resonance frequency. A typically used approach to maintain effective power transfer in this scenario is to track the varying resonance frequency by changing the operating frequency of the system. While this variable-frequency approach is effective, it makes the design of magnetics and gate driver circuitry challenging, as these are difficult to optimize for a wide range of frequencies, particularly when operating in the high-frequency (MHz) regime. Furthermore, in multi-MHz WPT systems, the operating frequency must stay within one of the designated industrial, scientific and medical (ISM) bands (e.g., 6.78 MHz, 13.56 MHz and 27.12 MHz), which have very restrictive bandwidths. Alternative approaches to dealing with coupling variations include the use of banks of switchable capacitors, or variable inductors in the compensating network, which allow the resonance frequency to remain roughly unchanged in the event of coupling variations. These approaches also have significant demerits, including additional size, weight and losses, particularly in high-power WPT systems. The recently introduced active variable reactance (AVR) rectifier addresses these challenges through an innovative rectifier structure that can provide variable compensation at a fixed frequency while maintaining high efficiency. However, the AVR rectifier requires several circuit components to be incorporated on the receiving side of the WPT system, where space and weight are at a premium (for instance, on-board an EV or inside a smartphone).

BRIEF SUMMARY

In one example implementation, a high-frequency inverter architecture is adapted to compensate for coupling variations in wireless power transfer (WPT) systems, while operating at a fixed frequency and maintaining high efficiency. This implementation, termed a variable compensation inverter (VCI), comprises a plurality of high-frequency inverters feeding a lossless resonant network, with the inputs of the inverters fed by controllable voltages. By appropriately controlling the input voltages of the individual inverters and their relative phase-shift, the VCI can maintain near-resistive, and slightly but sufficiently inductive, loading of the inverters even as the reactance of the WPT coupler changes; hence, providing compensation while maintaining zero-voltage and near-zero-current switching. The VCI also ensures that the output power of the WPT system is maintained at a fixed level even during coupling variations.

The foregoing and other aspects, features, details, utilities, and advantages of the present invention will be apparent from reading the following description and claims, and from reviewing the accompanying drawings.

BRIEF SUMMARY OF THE DRAWINGS

FIG. 2(a) shows an inverter relative phase-shift; FIG. 2(b) shows input voltages of top and bottom inverters in the VCI; and FIG. 2(c) showns a resultant reactance seen at the output of the two inverters.

FIGS. 5(a) through 5(c) are graphs showing measured waveforms of switch-node voltages of two bridge inverters of a variable compensation inverter (VCI), and the voltage across the resistive load for: FIG. 5(a) nominal operating condition with no misalignment, FIG. 5(b) 50% misalignment with no compensation, and FIG. 5(c) 50% misalignment fully compensated by the VCI.

DETAILED DESCRIPTION

Figure 1:
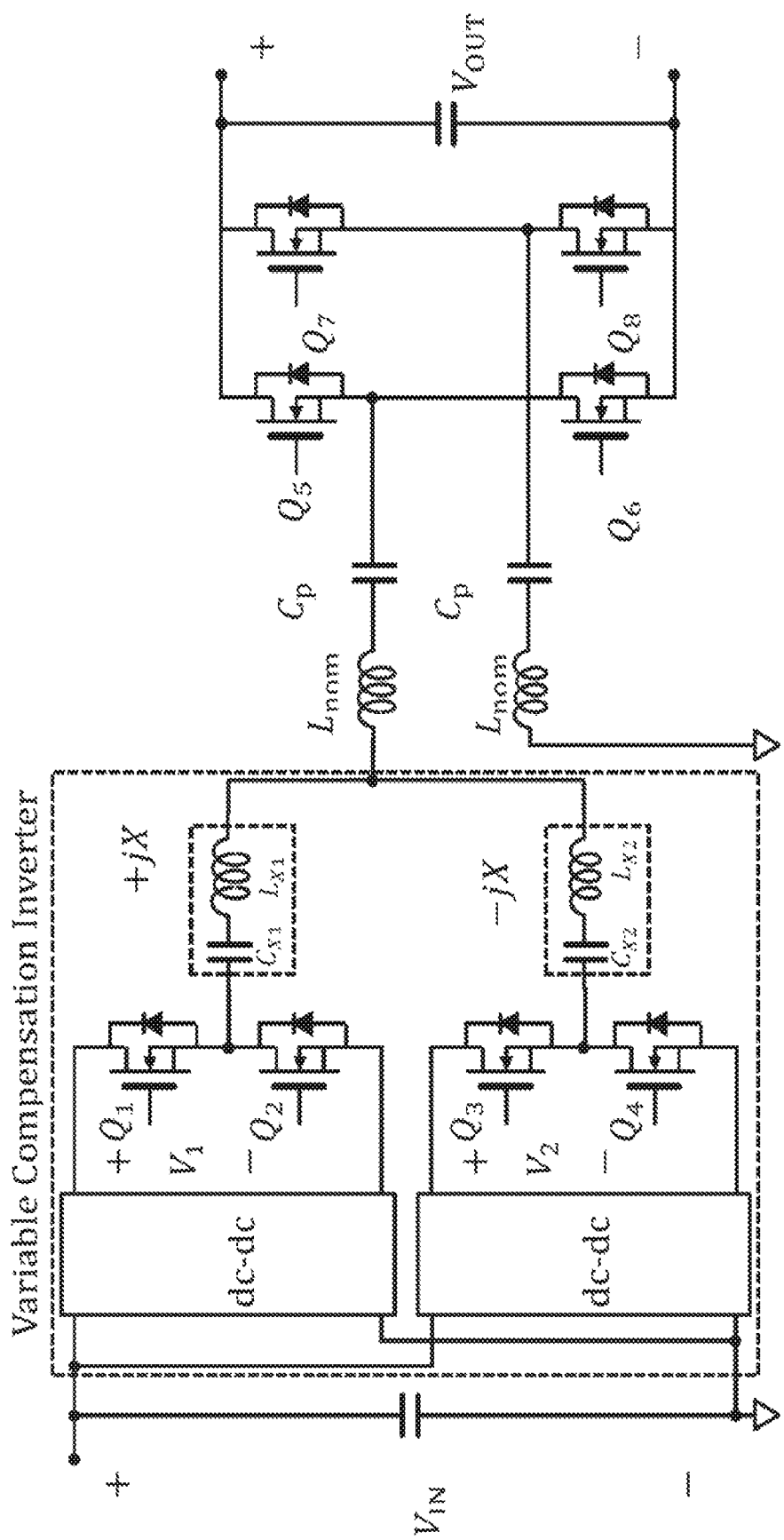
FIG. 1 shows an example implementation of a variable compensation inverter (VCI) architecture in an example utilization in a capacitive wireless power transfer (WPT) system.

FIG. 1 shows one example implementation of a VCI architecture in an example utilization in a capacitive WPT system. In this example, the system operates at a fixed frequency, and the inductors $L_{nom}$ compensate for the reactance of the capacitive coupler (labeled as $C_p$ in FIG. 1) under nominal operating conditions; for example, when the transmitting and receiving sides of the coupler are perfectly aligned. The VCI shown in FIG. 1 comprises two dc-dc converters feeding two half-bridge inverters. Although half-bridge inverters are shown in this particular implementation, any other type(s) of inverters may be used within the VCI, such as but not limited to full bridge inverters, single switch inverters. The output power of the two bridge inverters is then combined using a lossless resonant network comprising two branches having equal but opposite reactances (+X and −X). The VCI builds upon the concepts of an impedance control network (ICN), examples of which are described in J. Lu, D. J. Perreault, D. M. Otten and K. K. Afridi, "Impedance Control Network Resonant DC-DC Converter for Wide-Range High-Efficiency Operation," *IEEE Transactions on Power Electronics*, vol. 31, no. 7, pp. 5040-5056, July 2016, incorporated by reference herein. However, through its use of the dc-dc converters, the VCI differs both topologically and functionally from an ICN. When the coupling reactance $$X_C\left(=-\frac{1}{\omega_s C_p}\right)$$

is at its nominal value, the two dc-dc converters can operate in pass-through mode, and the input voltages of the two bridge inverters ($V_1$ and $V_2$ in FIG. 1), both equal the dc input voltage $V_{IN}$. The phase-shift between the two inverters under this nominal operating condition is given by:

$$2\Delta = \cos^{-1}\sqrt{1 - \frac{X^2}{\frac{K_{rec}^2 V_{OUT}^4}{P_{OUT}^2}}}.$$

Here, $V_{OUT}$ and $P_{OUT}$ are the dc output voltage and rated output power of the WPT system, respectively, and $K_{rec}$ is a constant associated with the topology of the rectifier $$\left(K_{rec} = \frac{8}{\pi^2}\right)$$

for the full-bridge rectifier shown in FIG. 1). When the coupling reactance $X_C$ changes from its nominal value by an amount $\delta X_C$, the phase-shift between the two bridge inverters of the VCI is modified to:

$$2\Delta = \cos^{-1}\sqrt{1 - \frac{X^2}{\frac{K_{rec}^2 V_{OUT}^4}{P_{OUT}^2} + \delta X_C^2}},$$

and the input voltages of the bridge inverters, $V_1$ and $V_2$, are simultaneously controlled using the dc-dc converters to satisfy the ratio:

$$\frac{V_2}{V_1} = \frac{X - \delta X_C}{\frac{K_{rec} V_{OUT}^2}{P_{OUT}} \sin 2\Delta - \delta X_C \cos 2\Delta}.$$

Figure 2A:
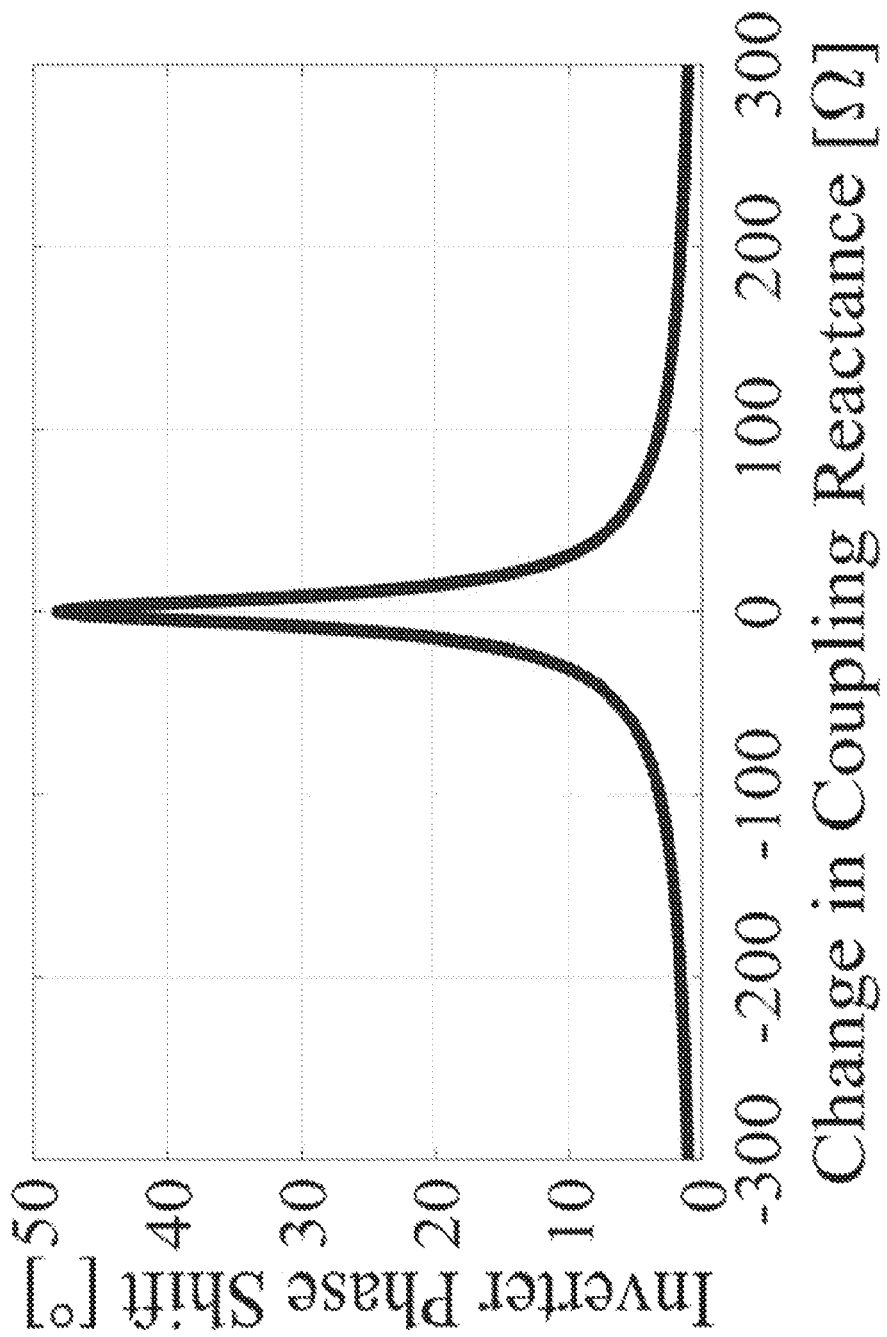
FIGS. 2(a) through 2(c) show graphs illustrating variations in operating parameters of the example VCI shown in FIG. 1 as a coupling reactance changes.
Figure 2B:
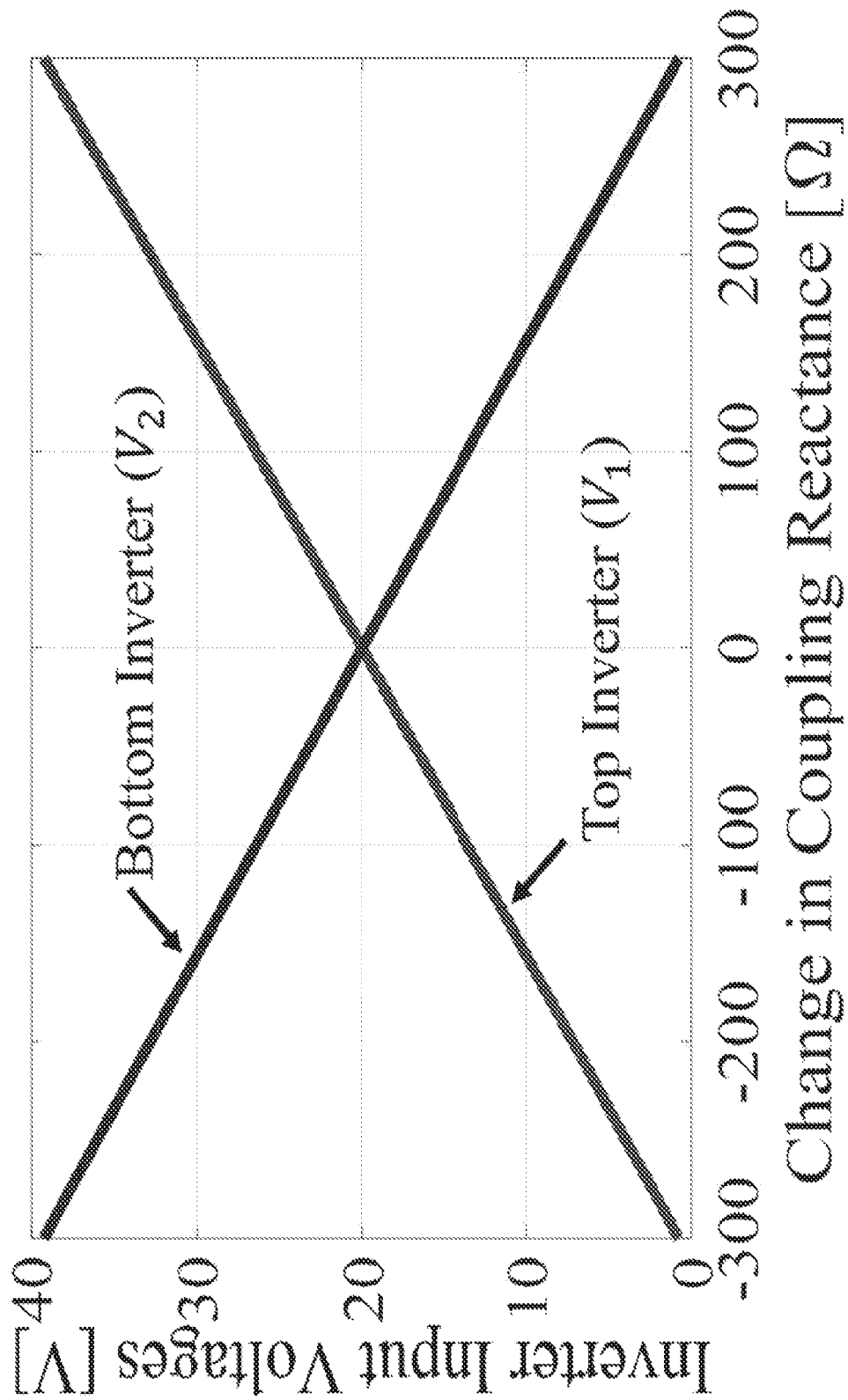
Figure 2C:
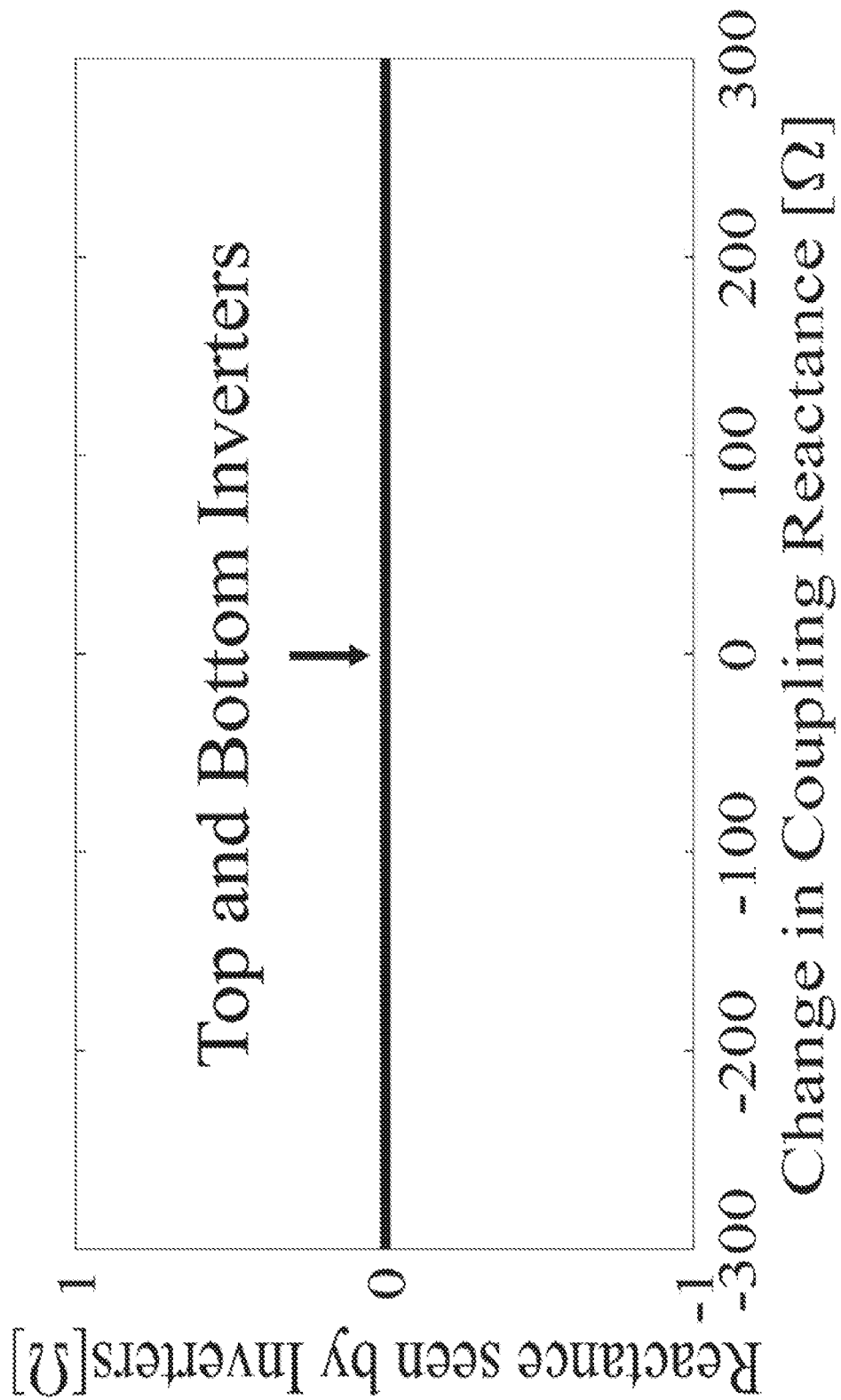

With the inverter phase-shift and input voltage ratio controlled according to the above relationships, the impedances seen at the outputs of the two bridge inverters are purely resistive, as illustrated for a wide range of coupling variation in an example capacitive WPT application in FIGS. 2(a)-2(c) (see FIG. 2(c)). Therefore, the bridge inverters process purely real power, and the VCI fully compensates for coupling variations. Furthermore, the purely resistive impedances enable zero-current switching (ZCS) of the inverter transistors. By operating at a frequency slightly higher than the designed frequency, the inverter impedances become slightly inductive, facilitating zero-voltage switching (ZVS) and near-ZCS. This enables the VCI to fully compensate for coupling variations while maintaining soft-switching.

The VCI of FIG. 1 is also capable of maintaining a fixed output power level during coupling variations. This can be achieved by imposing an additional constraint on the input voltages of the two bridge rectifiers, given by:

$$V_1^2 + V_2^2 - 2V_1 V_2 \cos 2\Delta = \frac{2X^2 P_{OUT}^2}{K_{inv}^2 K_{rec} V_{OUT}^2}.$$

Figure 3:
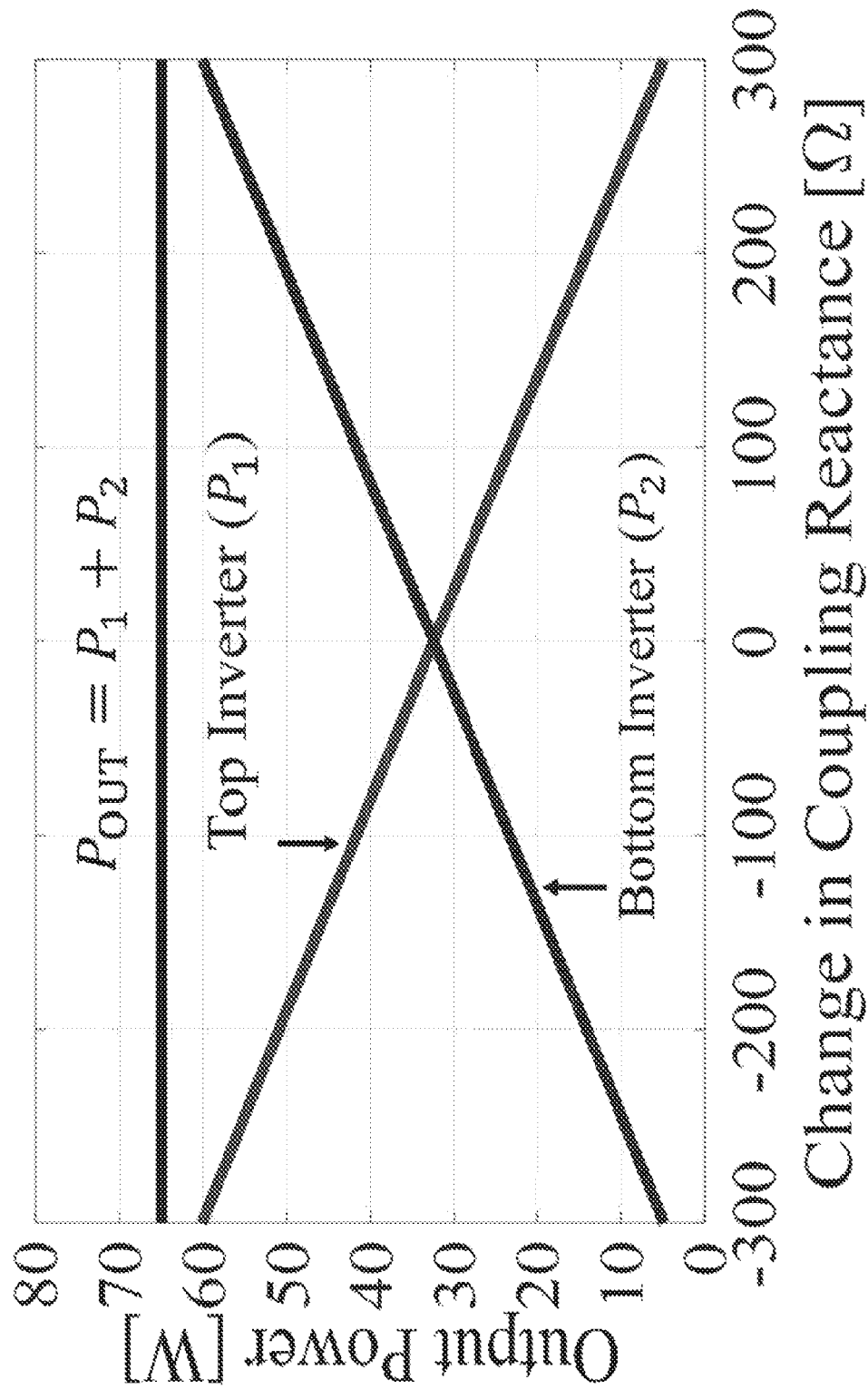
FIG. 3 is a graph showing an example diagram of total output power and the power processed by two inverters of the variable compensation inverter (VCI) of FIG. 1 as a function of the change in coupling reactance.

Here, $K_{inv}$ is a voltage gain associated with the two bridge inverters, and equals $$\frac{2}{\pi}$$

for the half-bridge inverters of the VCI of FIG. 1. The output power processed by the two bridge inverters of the VCI, and the total output power of the WPT system with the inverter input voltages and phase-shift controlled according to the above relationships, are shown as a function of the change in coupling reactance $\delta X_C$ in FIG. 3. As can be seen, as the coupling reactance varies over a wide range, the power processed by the top inverter decreases, while that processed by the bottom inverter increases, in a manner that total output power remains constant.

The value of the differential reactance X in the VCI of FIG. 1 is selected to ensure that the WPT system delivers the required output power $R_{OUT}$ under nominal operating conditions. This can be ensured by choosing the differential reactance to be:

$$X = \frac{K_{inv} V_{IN}}{P_{OUT}} \sqrt{2K_{rec} V_{OUT}^2 - K_{inv}^2 V_{IN}^2}.$$

Various combinations of the inductances and capacitances of the two inverter tanks ($L_{X1}$, $C_{X1}$ and $L_{X2}$, $C_{X2}$ in FIG. 1) can realize this value of X, but with different tradeoffs between inductor losses and turn-off switching losses. To achieve a favorable tradeoff, the circuit waveforms of the WPT system of FIG. 1 can be evaluated across a range of inductance and capacitance values using an accurate state-space based modeling approach, and the inductance-capacitance combinations that result in the lowest total losses are selected.

Figure 4:
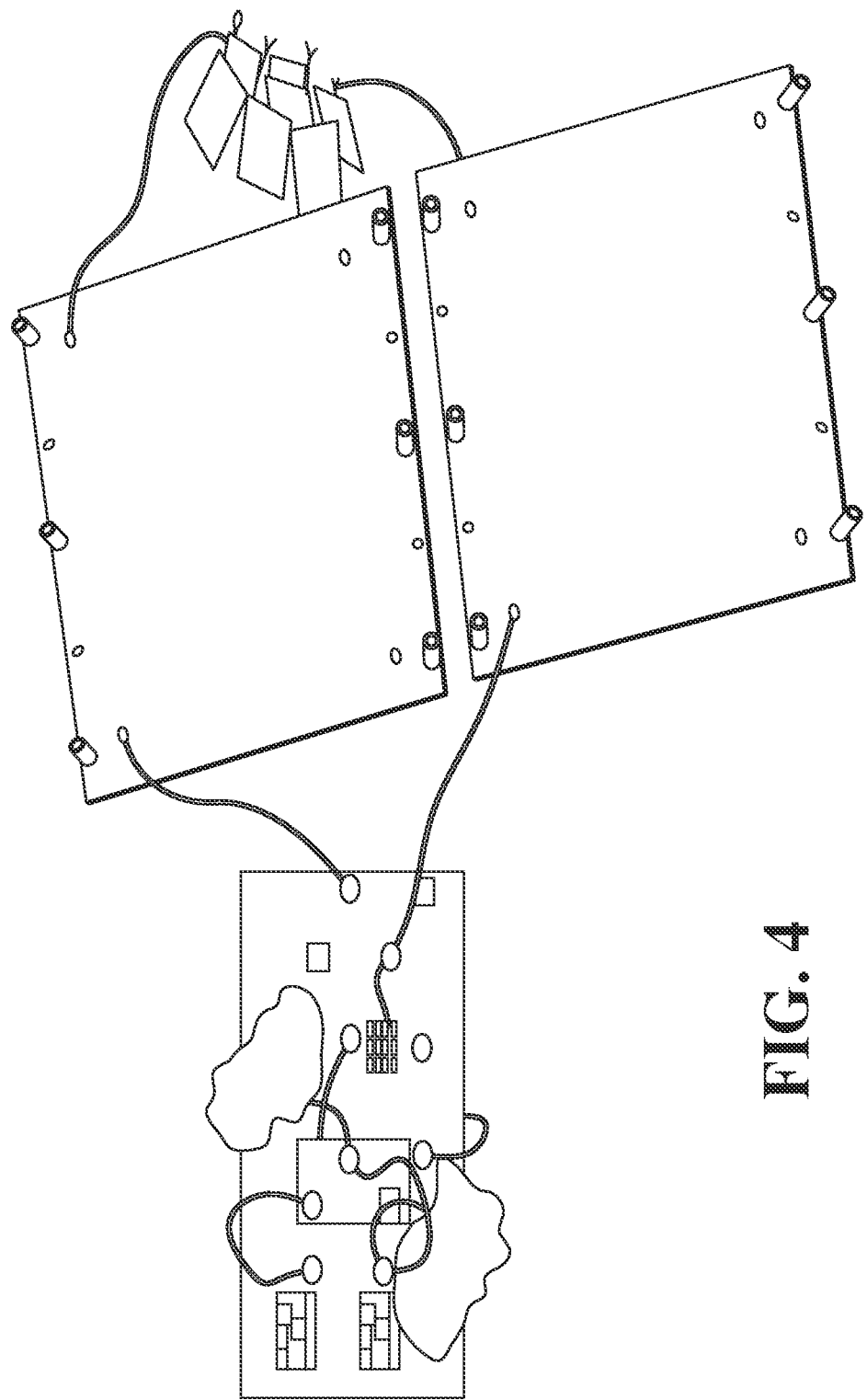
FIG. 4 is a schematic of an example prototype capacitive WPT system incorporating a variable compensation inverter.
Figure 5A:
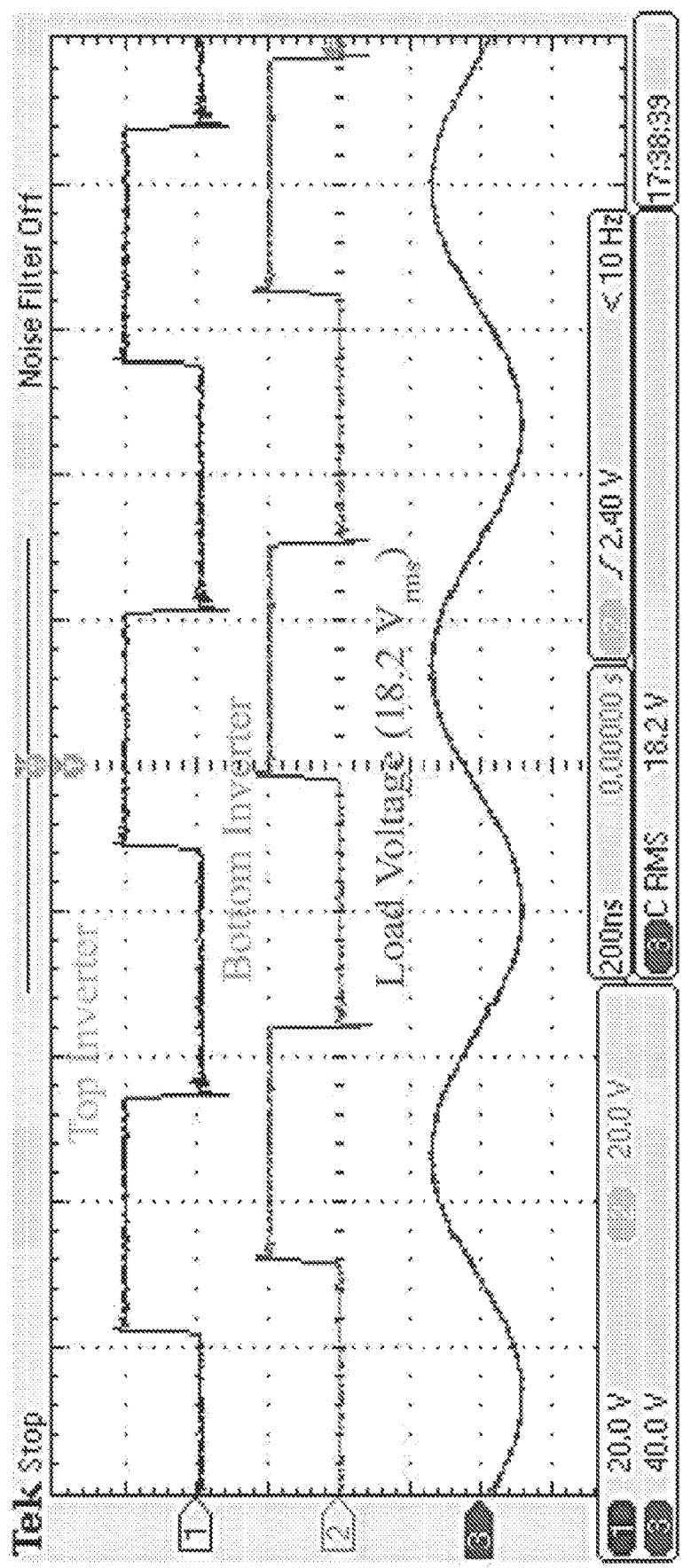
Figure 5B:
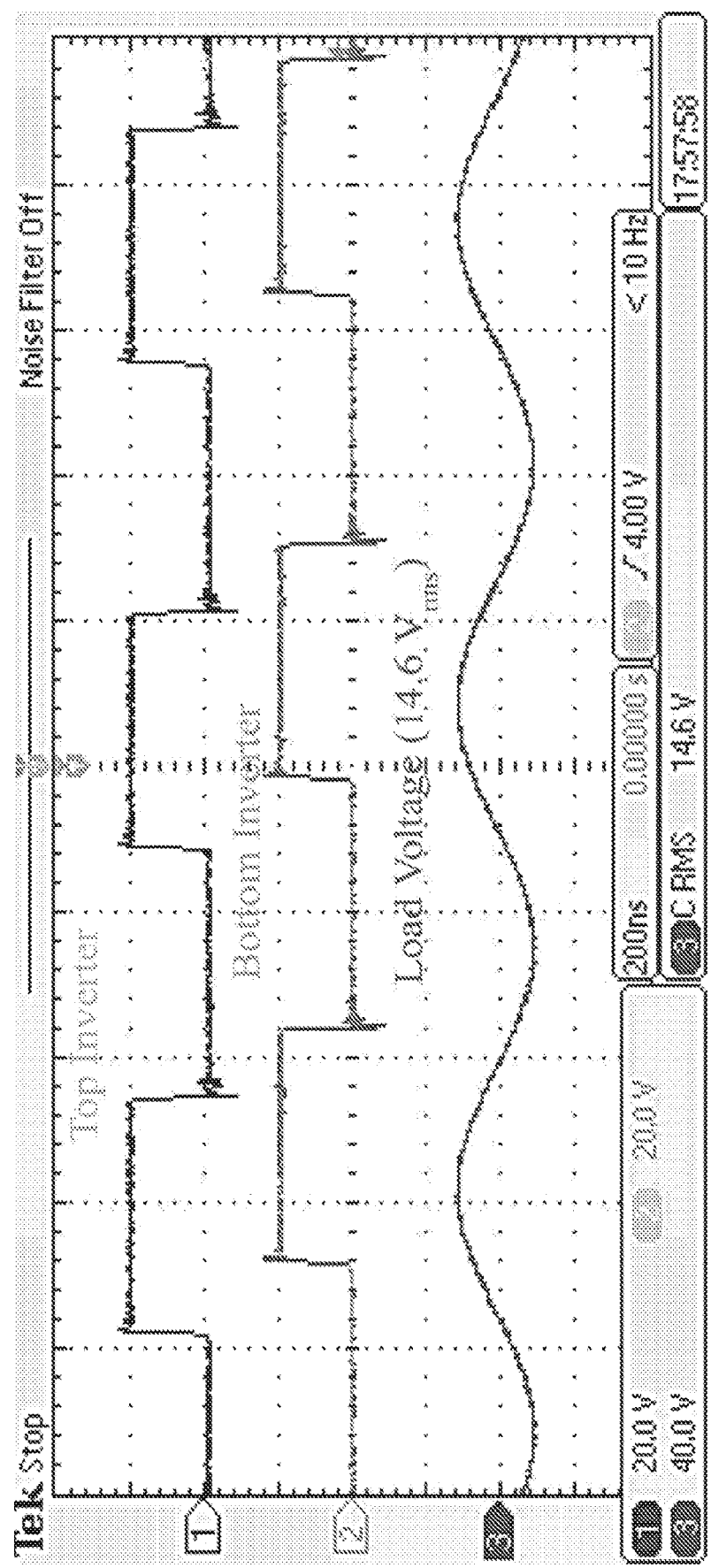
Figure 5C:
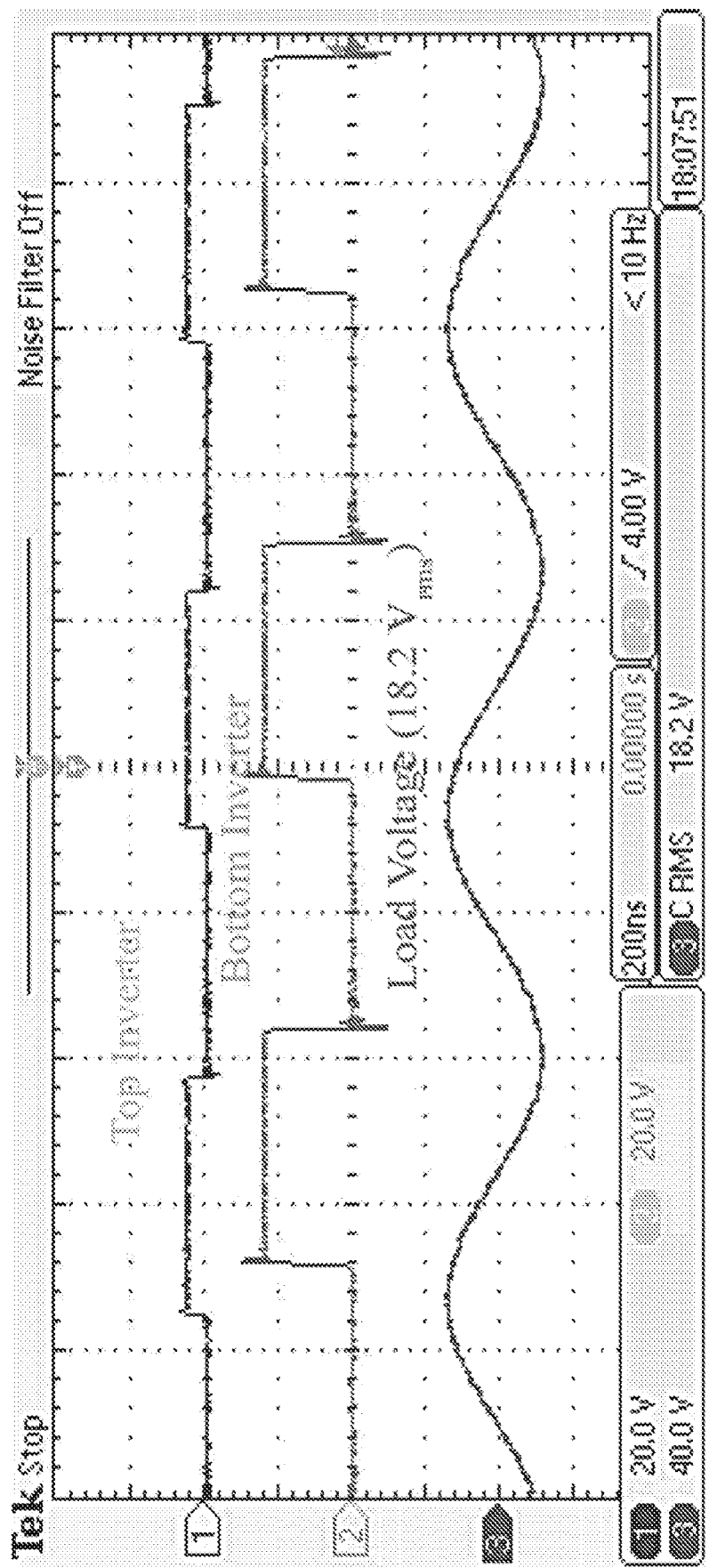

A prototype VCI similar to the one shown in FIG. 1 is designed, built and tested with a 1.5-MHz, 65-W capacitive WPT system with dc input and output voltages of 20 V, suitable for a laptop charging application. A schematic of the prototype system is shown in FIG. 4. The capacitive coupler in the prototype system is implemented using two pairs of 10 cm×10 cm plates separated by a 1-mm air-gap, and the rectifier and laptop battery are emulated using an equivalent load resistor. The system is first tested under nominal operating conditions, that is, with the coupling plates perfectly aligned, and with the input voltages of the two bridge rectifiers set equal to the dc input voltage $V_{IN}$ of 20 V. The corresponding waveforms of the inverter switch-node voltages and the voltage across the load resistor are shown in FIG. 5(a). The system transfers the rated power of 65 W at an efficiency of 82% under these conditions. The plates are then misaligned by 50% along a lateral dimension, and the resultant waveforms are shown in FIG. 5(b). It can be seen that the load voltage decreases; the output power falls by 35% to 42 W, and the efficiency falls to 74%. The VCI then decreases the inverter phase-shift, increases the input voltage of the bottom inverter, and decreases the input voltage of the top inverter, in accordance with the relationships presented above. The resultant waveforms are shown in FIG. 5(c). As can be seen, the load voltage is restored to the original level shown in FIG. 5(a); the output power is restored to 65 W, and the efficiency increases back to 82%. Hence, the prototype VCI successfully compensates for coupling variations while maintaining fixed output power and high efficiency.

EXAMPLE VARIANTS

The Variable Compensation Inverter (VCI) described above is merely one example implementation of many possible implementations of a VCI. A number of additional example embodiments of the VCI are also provided as follows.

Figure 6:
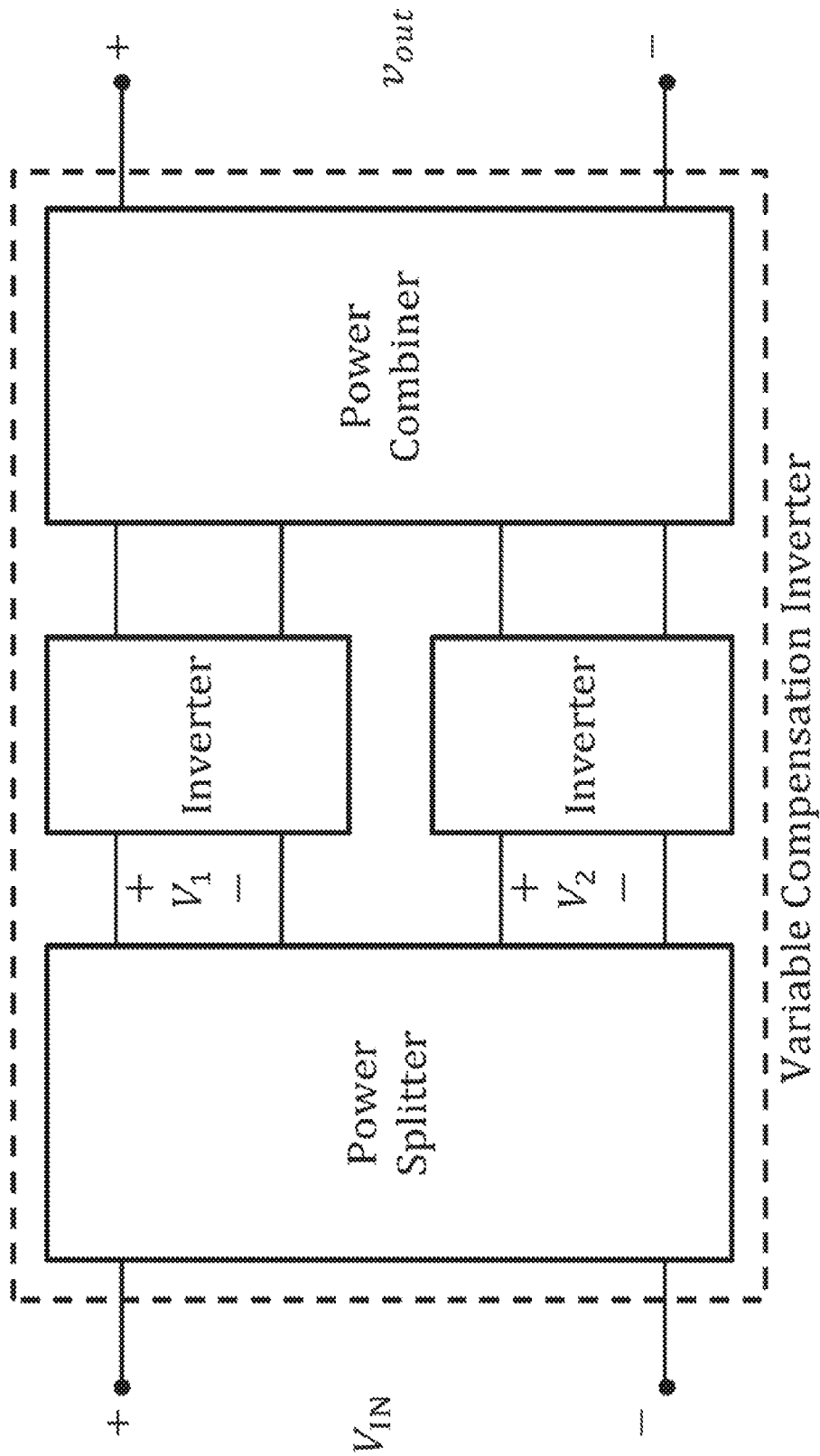
FIG. 6 is a schematic diagram of an example implementation of a VCI comprising a power splitter circuit, a plurality of inverters and a power combining circuit.

FIG. 6 shows a schematic diagram of an alternative implementation of a VCI comprising a power splitter circuit, a plurality of inverters and a power combining circuit. In this particular implementation, for example, the power splitter circuit is coupled at a pair of input terminals to an input voltage $V_{IN}$ and at a plurality of output ports to input ports of each of the plurality of inverters providing voltages ($V_1$ and $V_2$ in this example) to the inverters. Each of the plurality of inverters is further coupled to input ports of the power combining circuit via output ports of the individual inverters. An output port of the power combining circuit provides an output voltage $v_{out}$ of the VCI.

Figure 7:
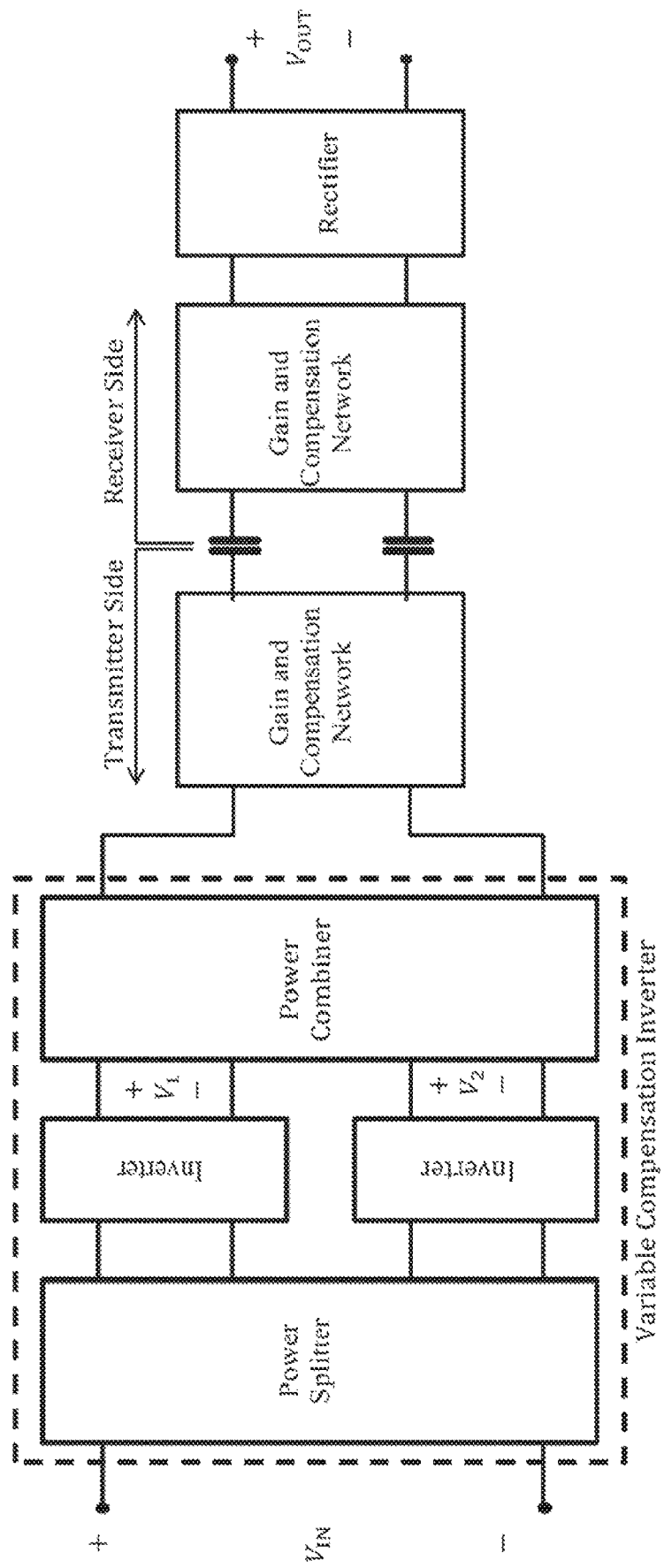
FIG. 7 shows a schematic diagram of another example implementation of a VCI comprising a power splitter circuit, a plurality of inverters and a power combining circuit utilized in a capacitive WPT system that employs circuit stages providing voltage and/or current gain and reactive compensation.

FIG. 7 shows a schematic diagram of another example implementation of a VCI comprising a power splitter circuit, a plurality of inverters and a power combining circuit utilized in a capacitive WPT system that employs circuit stages providing voltage and/or current gain and reactive compensation. In this example, the capacitive WPT system in this implementation comprises transmitter side and receiver side gain and compensation networks and a rectifier coupled to a WPT system output $v_{out}$. In the VCI shown in FIG. 7, for example, the power splitter comprises an input port coupled to an input voltage $V_{IN}$ and a plurality of output ports coupled to corresponding input ports of each of the plurality of inverters. Each of the plurality of inverters also comprise output ports ($V_1$ and $V_2$ shown in FIG. 7) coupled to corresponding input ports of the power combiner. An output port of the power combiner of the VCI is in turn coupled to an input port of the transmitter side gain and compensation network of the capacitive WPT system.

Figure 8:
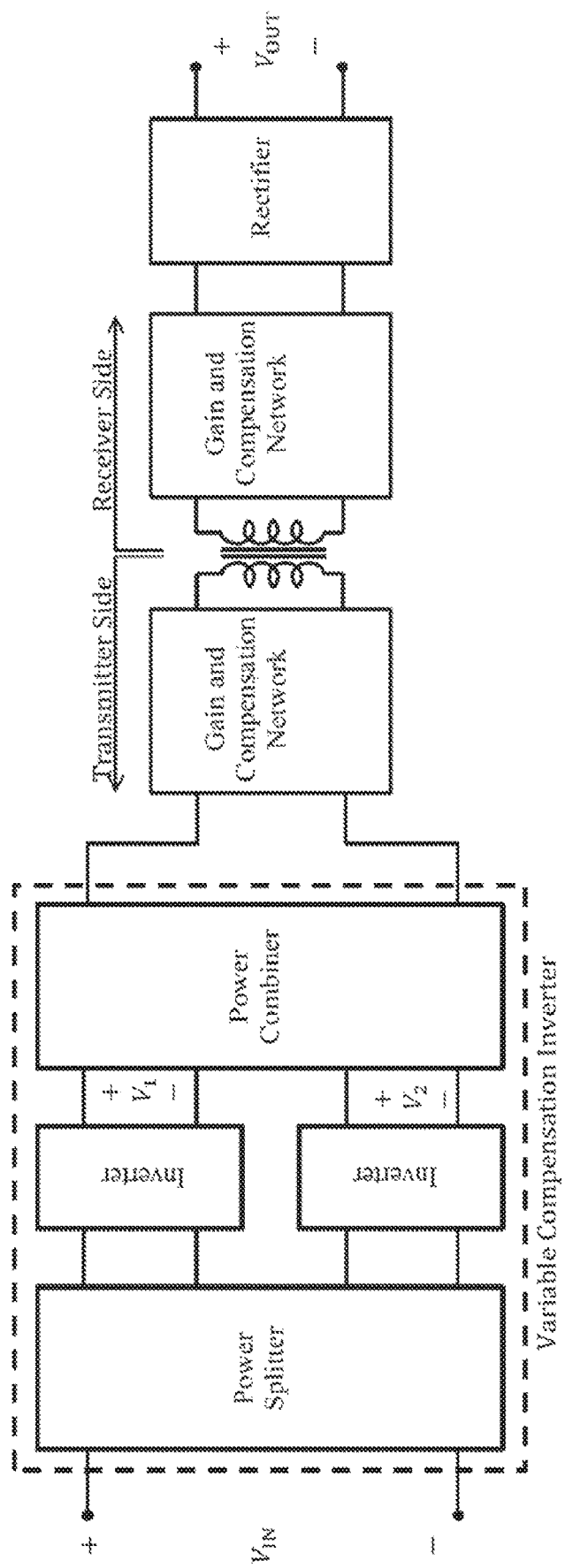
FIG. 8 shows a schematic diagram of yet another example implementation of a VCI utilized in an inductive WPT system comprising gain and compensation networks.

FIG. 8 shows a schematic diagram of yet another example implementation of a VCI utilized in an inductive WPT system comprising gain and compensation networks. In this particular implementation, for example, the VCI shown and described with reference to FIG. 7 in conjunction with a capacitive WPT system is utilized instead in an example inductive WPT system that employs circuit stages providing voltage and/or current gain and reactive compensation.

Figure 9:
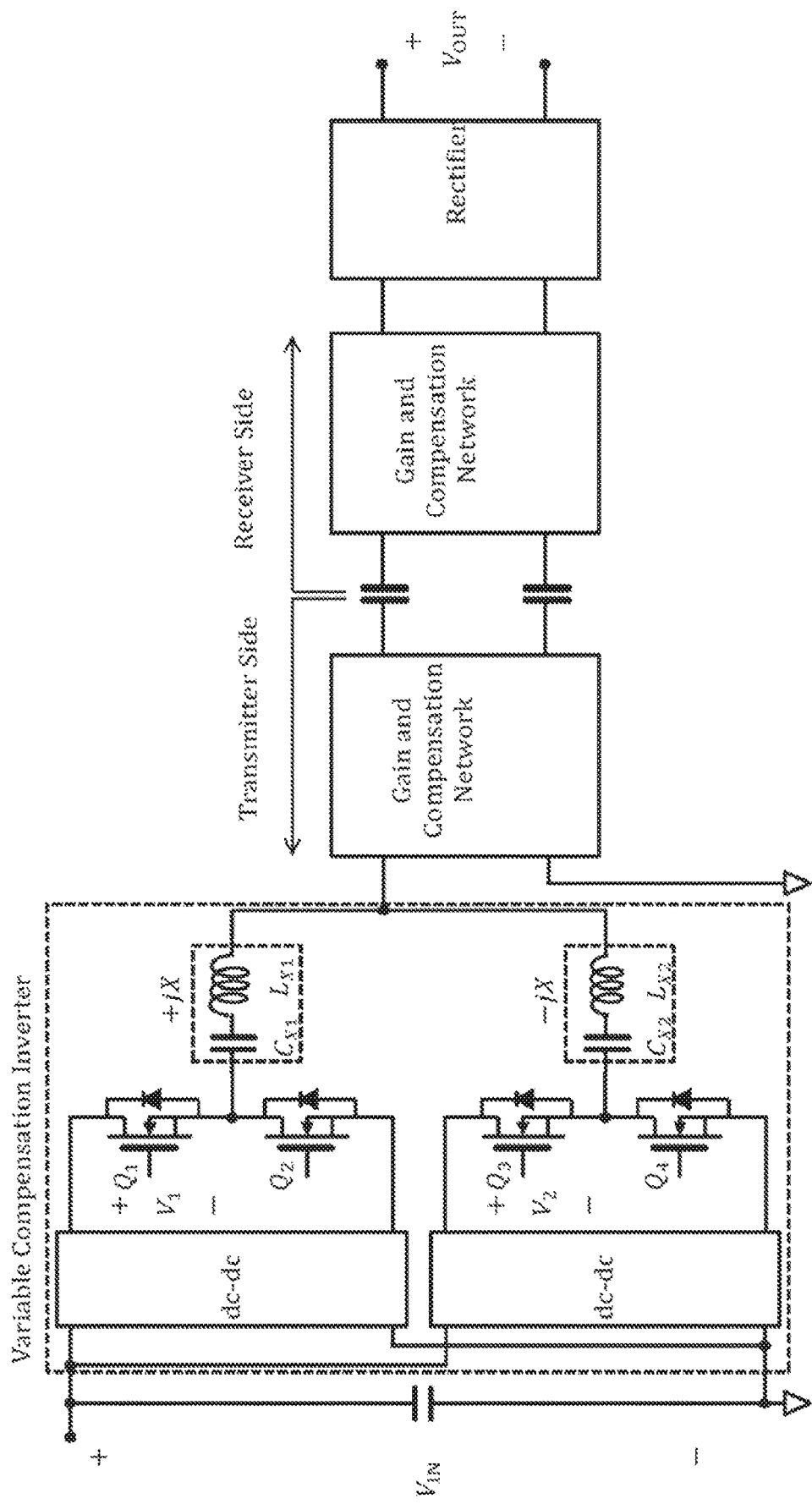
FIG. 9 shows a schematic diagram of another example implementation of a VCI comprising a plurality of dc-dc converters in a power splitting circuit, a plurality of bridge inverters, and a reactive network in a power combining circuit.

FIG. 9 shows a schematic diagram of another example implementation of a VCI comprising a plurality of dc-dc converters in a power splitting circuit, a plurality of bridge inverters, and a reactive network, such as described above with respect to FIG. 1, in a power combining circuit. In this example, the VCI is utilized in an example capacitive WPT system comprising gain and compensation networks and an output rectifier circuit.

Figure 10:
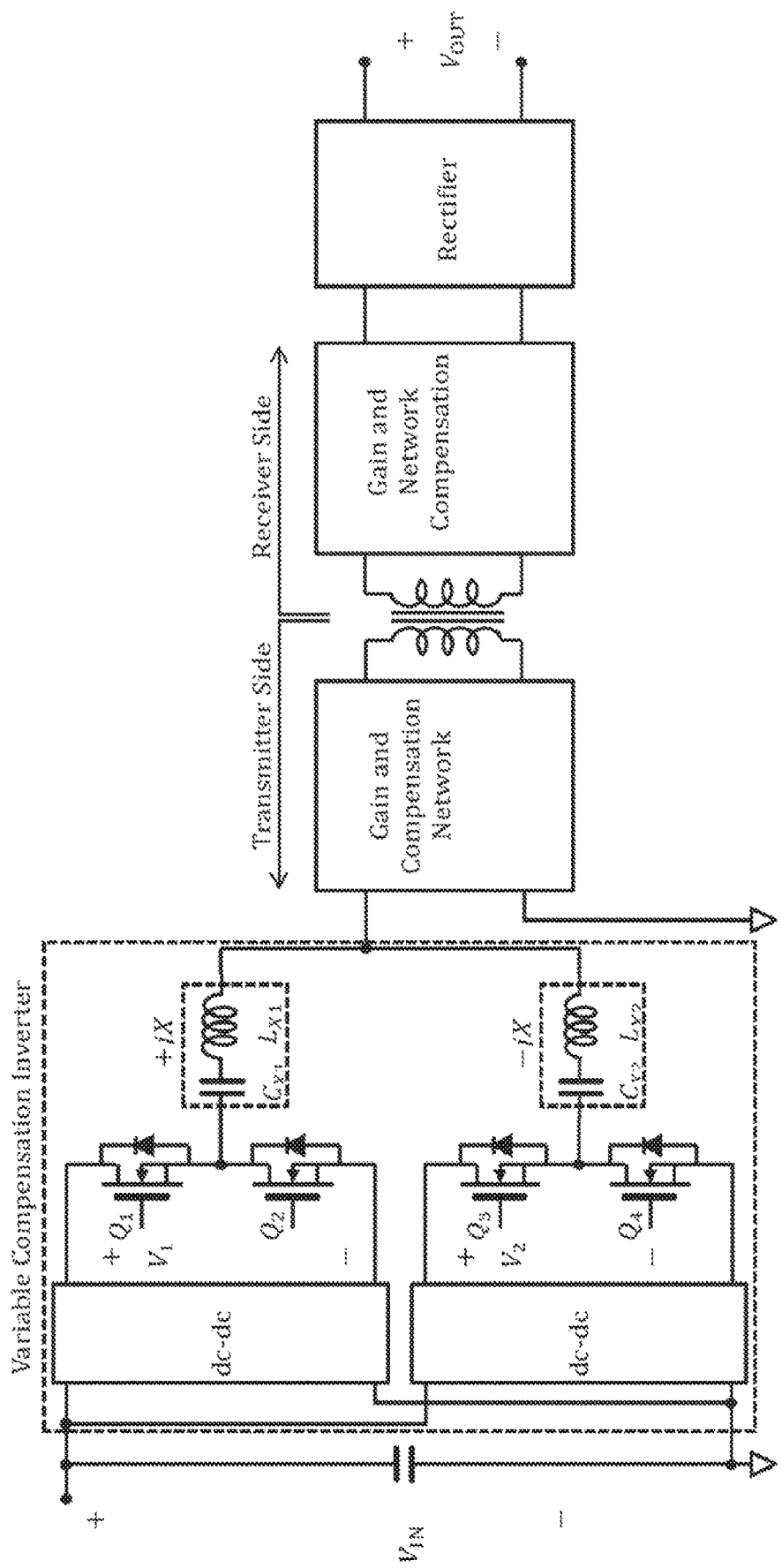
FIG. 10 shows a schematic diagram of yet another example implementation of a VCI comprising a plurality of dc-dc converters in a power splitting circuit, a plurality of bridge inverters, and a reactive network utilized in another example inductive WPT system comprising gain and compensation networks and an output rectifier circuit.

FIG. 10 shows a schematic diagram of yet another example implementation of the VCI shown in FIG. 9 comprising a plurality of dc-dc converters in a power splitting circuit, a plurality of bridge inverters, and a reactive network utilized in another example inductive WPT system comprising gain and compensation networks and an output rectifier circuit.

Figure 11:
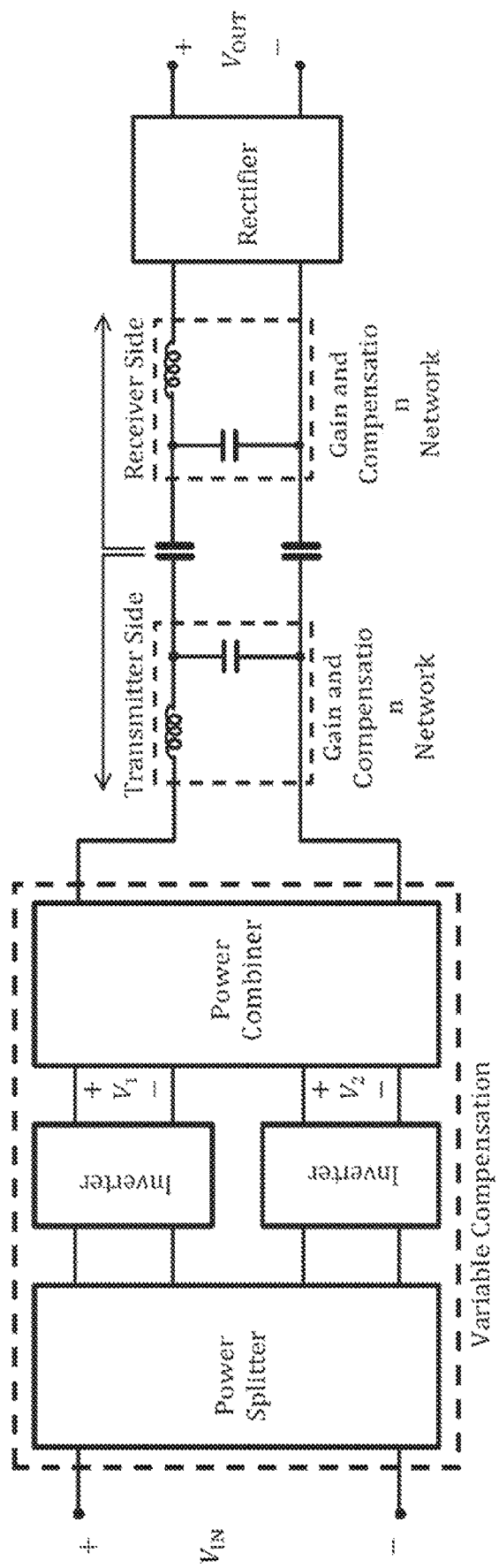
FIG. 11 shows a schematic diagram of another example implementation of a VCI utilized in a capacitive WPT system that employs L-section section stages to provide voltage and/or current gain and reactive compensation.

FIG. 11 shows a schematic diagram of another example implementation of a VCI utilized in a capacitive WPT system that employs L-section section stages to provide voltage and/or current gain and reactive compensation. Note that the WPT system of FIG. 11 can also utilize multistage L-section networks. Furthermore, the L-section networks can be adapted to compress the compensation required from the VCI.

Figure 12:
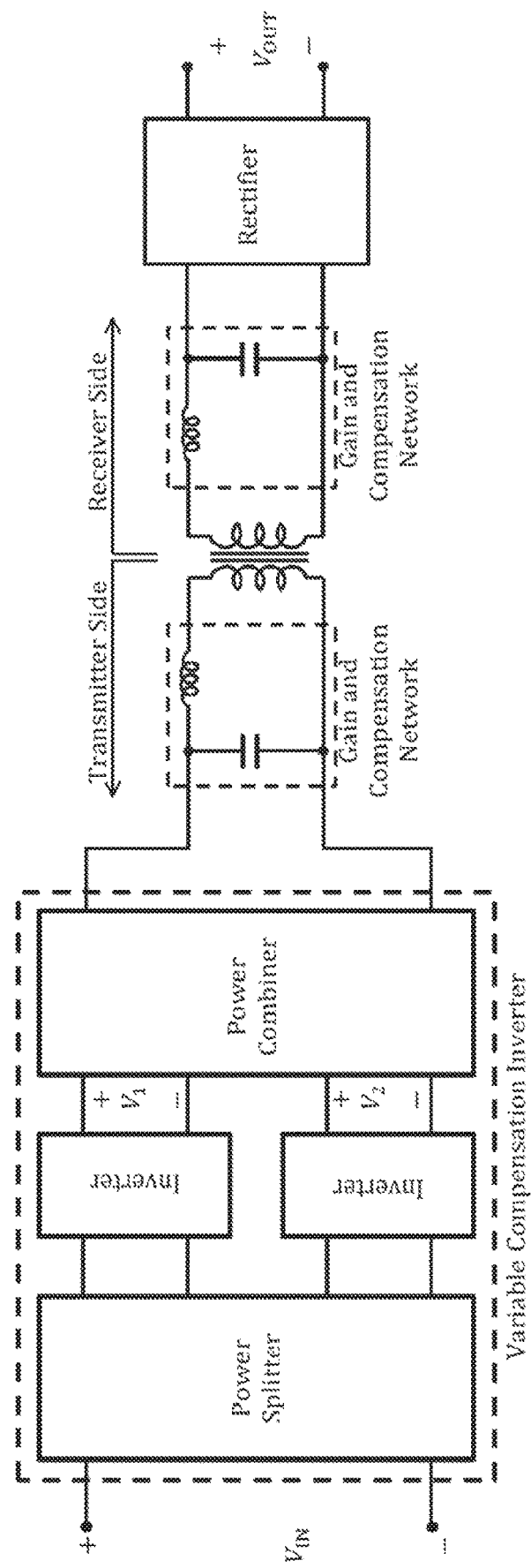
FIG. 12 shows a schematic diagram of yet another example implementation in which a VCI is utilized in an inductive WPT system that employs L-section stages to provide voltage and/or current gain and reactive compensation.

FIG. 12 shows a schematic diagram of yet another example implementation in which a VCI is utilized in an inductive WPT system that employs L-section stages to provide voltage and/or current gain and reactive compensation. Note that the WPT system of FIG. 12 can also utilize multistage L-section networks. Furthermore, the L-section networks can be adapted to compress the compensation required from the VCI.

While individual example variants are shown and described with respect to FIGS. 1 through 12, the variants are merely examples to simplify the description of individual elements that are shown in the variants. Different elements described with respect to one or more figures (e.g., use of a wireless power transfer element, use of a particular wireless power transfer element (e.g., capacitive or inductive), use of reactive elements in a VCI, use of gain and/or compensation networks, use of a rectifier on the output of a WPT, use of particular types of inverters (half bridge, full bridge, etc.)) can be used in systems shown in different figures. The specification merely introduces different concepts for ease of description and not to imply that the specific enabling examples are the only contemplated variations.

Although implementations have been described above with a certain degree of particularity, those skilled in the art could make numerous alterations to the disclosed embodiments without departing from the spirit or scope of this invention. All directional references (e.g., upper, lower, upward, downward, left, right, leftward, rightward, top, bottom, above, below, vertical, horizontal, clockwise, and counterclockwise) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims.

The implementations described herein may include operations implemented as logical steps in one or more computer systems. The logical operations are implemented (1) as a sequence of processor-implemented steps executing in one or more computer systems and (2) as interconnected machine or circuit modules within one or more computer systems. The implementation is a matter of choice, dependent on the performance requirements of a particular computer system. Accordingly, the logical operations making up the embodiments and/or implementations described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of exemplary implementations of the invention. Since many implementations of the invention can be made without departing from the spirit and scope of the invention, the invention resides in the claims hereinafter appended. Furthermore, structural features of the different implementations may be combined in yet another implementation without departing from the recited claims.

Furthermore, certain operations in the methods described above must naturally precede others for the described method to function as described. However, the described methods are not limited to the order of operations described if such order sequence does not alter the functionality of the method. That is, it is recognized that some operations may be performed before or after other operations without departing from the scope and spirit of the claims.

It is important to recognize, that while certain implementations described herein refer to optimization of one or more feature, system, operation, method, process or the like, actual mathematical or other optimization is not required in other implementations. While it may be possible to "optimize" a particular campaign, one of ordinary skill in the art would recognize from the teachings of the present disclosure, the similar techniques, systems and processes could also be used to improve campaigns, ad delivery or the like without achieving absolute optimization. Rather, different implementations provide for optimization or improved operation, planning, achievement, delivery, etc. of advertising campaigns.

What is claimed is:

1. A variable compensation inverter circuit comprising:
a variable compensation inverter circuit input port;
a variable compensation inverter circuit output port;
a power splitter circuit comprising a power splitter circuit input port coupled to the variable compensation inverter circuit input port, the power splitter circuit comprising a first power splitter circuit output port and a second power splitter circuit output port;
a first inverter circuit comprising a first inverter circuit input port and a first inverter circuit output port, the first inverter circuit input port coupled to the first power splitter circuit output port;
a second inverter circuit comprising a second inverter circuit input port and a second inverter circuit output port, the second inverter circuit input port coupled to the second power splitter circuit output port; and
a power combiner circuit comprising a first power combiner circuit input port, a second power combiner circuit input port and a power combiner circuit output port, wherein the first power combiner circuit input port is coupled to the first inverter circuit output port, the second power combiner circuit input port is coupled to the second inverter circuit output port and the power combiner circuit output port is coupled to the variable compensation inverter circuit output port,
wherein the power splitter circuit is adapted to alter a first voltage level at the first inverter input port and a second voltage at the second inverter input port and the variable compensation inverter circuit is adapted to alter the reactive compensation provided by the variable compensation inverter circuit via a ratio of the first voltage level to the second voltage level.

2. The variable compensation inverter circuit of claim 1 wherein a gain and compensation network circuit and a wireless power transfer (WPT) circuit are coupled in series between the variable compensation inverter circuit output port and a system output port.

3. The variable compensation inverter circuit of claim 1 wherein the power combiner circuit comprises:
a first reactive network coupled between the first inverter circuit output port and the variable compensation inverter circuit output port and; and
a second reactive network coupled between the first inverter circuit output port and the variable compensation inverter circuit output port,
wherein the power splitter circuit comprises at least one dc-dc converter coupled between the variable compensation inverter circuit input port and at least one of the first and second inverter circuit input ports.

4. The variable compensation inverter circuit of claim 3 wherein the first reactive network provides a first reactance of +jX and the second reactive network provides a second reactance of −jX.

5. The variable compensation inverter circuit of claim 3 wherein the first reactive network provides a first reactance of $+jX_1$ and the second reactive network provides a second reactance of $-jX_2$, wherein X1 and X2 comprise the same or different constant values.

6. The variable compensation inverter circuit of claim 3 wherein the variable compensation inverter circuit output port is coupled to a gain and compensation circuit adapted to compress a compensation requirement for the variable compensation inverter circuit.

7. A wireless power transfer system comprising:
a variable compensation inverter comprising:
a variable compensation inverter circuit input port;
a variable compensation inverter circuit output port;
a power splitter circuit comprising a power splitter circuit input port coupled to the variable compensation inverter circuit input port, the power splitter circuit comprising a first power splitter circuit output port and a second power splitter circuit output port;
a first inverter circuit comprising a first inverter circuit input port and a first inverter circuit output port, the first inverter circuit input port coupled to the first power splitter circuit output port;
a second inverter circuit comprising a second inverter circuit input port and a second inverter circuit output port, the second inverter circuit input port coupled to the second power splitter circuit output port; and
a power combiner circuit comprising a first power combiner circuit input port, a second power combiner circuit input port and a power combiner circuit output port, wherein the first power combiner circuit input port is coupled to the first inverter circuit output port, the second power combiner circuit input port is coupled to the second inverter circuit output port and the power combiner circuit output port is coupled to the variable compensation inverter circuit output port,
wherein the power splitter circuit is adapted to alter a first voltage level at the first inverter input port and a second voltage at the second inverter input port;
a wireless power transfer element coupled to the variable compensation inverter circuit output port, the wireless power transfer element comprising at least one of a capacitor and an inductor; and
at least one gain and compensation network coupled to the variable compensation inverter circuit output port, the at least one gain and compensation network coupled between at least one of the group comprising: (i) between the variable compensation inverter circuit output port and the wireless power transfer element and (ii) between the wireless power transfer element and an output port of the wireless power transfer system,
wherein the variable compensation inverter circuit is adapted to alter reactive compensation provided by the variable compensation inverter circuit via a ratio of the first voltage level to the second voltage level.

8. The system of claim 7 wherein the gain and compensation network circuit and the wireless power transfer element are coupled in series between the variable compensation inverter circuit output port and a system output port.

9. The system of claim 7 wherein the power combiner circuit comprises:
a first reactive network coupled between the first inverter circuit output port and the variable compensation inverter circuit output port and; and
a second reactive network coupled between the first inverter circuit output port and the variable compensation inverter circuit output port,
wherein the power splitter circuit comprises at least one dc-dc converter coupled between the variable compensation inverter circuit input port and at least one of the first and second inverter circuit input ports.

10. The system of claim 9 wherein the first reactive network provides a first reactance of +jX and the second reactive network provides a second reactance of –jX.

11. The system of claim 9 wherein the first reactive network provides a first reactance of $+jX_1$ and the second reactive network provides a second reactance of $-jX_2$, wherein X1 and X2 comprise the same or different constant values.

12. The system of claim 9 wherein the variable compensation inverter circuit output port is coupled to a gain and compensation circuit adapted to compress a compensation requirement for the variable compensation inverter circuit.

13. A method for controlling a variable compensation inverter circuit, the method comprising:
receiving an input signal at the variable compensation inverter circuit, the variable compensation inverter circuit comprising:
a variable compensation inverter circuit input port;
a variable compensation inverter circuit output port;
a power splitter circuit comprising a power splitter circuit input port coupled to the variable compensation inverter circuit input port, the power splitter circuit comprising a first power splitter circuit output port and a second power splitter circuit output port;
a first inverter circuit comprising a first inverter circuit input port and a first inverter circuit output port, the first inverter circuit input port coupled to the first power splitter circuit output port;
a second inverter circuit comprising a second inverter circuit input port and a second inverter circuit output port, the second inverter circuit input port coupled to the second power splitter circuit output port; and
a power combiner circuit comprising a first power combiner circuit input port, a second power combiner circuit input port and a power combiner circuit output port, wherein the first power combiner circuit input port is coupled to the first inverter circuit output port, the second power combiner circuit input port is coupled to the second inverter circuit output port and the power combiner circuit output port is coupled to the variable compensation inverter circuit output port,
altering a first voltage level at the first inverter input port and a second voltage level at the second inverter input port via the power splitter circuit,
wherein the variable compensation inverter circuit is adapted to alter the reactive compensation provided by the variable compensation inverter circuit via a ratio of the first voltage level to the second voltage level.

14. The method of claim 13 wherein a gain and compensation network circuit and a wireless power transfer (WPT) circuit are coupled in series between the variable compensation inverter circuit output port and a system output port.

15. The method of claim 13 wherein the power combiner circuit comprises:
a first reactive network coupled between the first inverter circuit output port and the variable compensation inverter circuit output port and; and
a second reactive network coupled between the first inverter circuit output port and the variable compensation inverter circuit output port,
wherein the power splitter circuit comprises at least one dc-dc converter coupled between the variable compensation inverter circuit input port and at least one of the first and second inverter circuit input ports,
wherein the first reactive network provides a first reactance of +jX and the second reactive network provides a second reactance of –jX.

16. The variable compensation inverter circuit of claim 15 wherein the first reactive network provides a first reactance of $+jX_1$ and the second reactive network provides a second reactance of $-jX_2$, wherein X1 and X2 comprise the same or different constant values.

17. The variable compensation inverter circuit of claim 15 wherein the variable compensation inverter circuit output port is coupled to a gain and compensation circuit adapted to compress a compensation requirement for the variable compensation inverter circuit.

* * * * *